United States Patent
Teige

[15] 3,648,904
[45] Mar. 14, 1972

[54] LIQUID DISPENSING APPARATUS
[72] Inventor: William Teige, North Hollywood, Calif.
[73] Assignee: Columware, Inc., Lynwood, Calif.
[22] Filed: Mar. 18, 1970
[21] Appl. No.: 20,700

[52] U.S. Cl............................222/380, 222/413, 222/504
[51] Int. Cl.................................................B67d 5/48
[58] Field of Search..............222/413, 412, 129.1, 380, 504, 222/563, 559

[56] References Cited
UNITED STATES PATENTS
1,507,516  9/1924  Richardson............................222/413
3,493,146  2/1970  Conners et al.....................222/566 X
2,753,089  7/1956  Phillips..............................222/413 X Primary Examiner—Robert B. Reeves
Assistant Examiner—John P. Shannon, Jr.
Attorney—Harris, Kiech, Russell & Kern

[57] ABSTRACT

A hot chocolate drink machine using liquid chocolate for mixing with hot water and aerating. A dispenser for the liquid chocolate comprising a motor driven auger in an outlet sleeve of the liquid container and a valve mechanism for opening and closing the outlet sleeve to provide a constant measure of liquid chocolate.

3 Claims, 5 Drawing Figures

PATENTED MAR 14 1972

INVENTOR.
WILLIAM TEIGE,

By His Attorneys
Harris, Kiech, Russell & Kern.

INVENTOR.
WILLIAM TEIGE,
By His Attorneys.
Harris, Kiech, Russell & Kern.

LIQUID DISPENSING APPARATUS

This invention relates to new and improved apparatus for dispensing a controlled amount of liquid. The apparatus is particularly suitable for use in handling liquid food products for subsequent mixing and dispensing for consumption. The invention is described herein as used with a hot chocolate machine for making a hot chocolate drink. However, it will be realized that the apparatus is equally suitable for dispensing other liquids, fudges, syrups, concentrates such as orange juices, etc.

A wide variety of machines have been developed and used for making and vending foods of various types, including hot chocolate drinks. It has been found that best results are obtained when each individual drink is prepared to order and in most machines today, a concentrate is mixed with hot water to provide the finished drink.

While liquid chocolate concentrate usually produces a tastier and more palatable hot chocolate drink, the problems encountered with dispensing the liquid chocolate have led machine manufacturers and operators to utilize powdered chocolate in the present day machines. It is an object of the present invention to provide a new and improved dispensing apparatus for dispensing controlled amounts of liquid. A particular object of the invention is to provide such apparatus which is suitable for dispensing liquid chocolate for use in hot chocolate drinks.

It is an object of the invention to provide such a dispenser which provides a constant measure of liquid and one which is not a gravity feed system and which is not sensitive to pressure head. A further object is to provide a positive displacement type of a dispenser and one which provides a sharp turn-on and cut-off for maintaining accuracy in the dispensed quantity. An additional object is to provide such a dispenser which may be used with the other components of conventional machines including the hot water sources, the mixers and aerators, and the electrical controls.

It is also an object to provide such a dispenser which is reliable and trouble free and which has a minimum of parts and one which is readily disassembled for cleaning.

It is a specific object of the invention to provide a new and improved dispenser incorporating an auger positioned in an outlet sleeve of a liquid container with means for driving the auger and a valve for opening and closing the outlet end of the sleeve, with the valve being opened and the auger driven in synchronism to deliver a predetermined quantity of liquid.

The invention also comprises novel details of construction and novel combinations and arrangements of parts, which more fully appear in the course of the following description. The drawings merely show and the description merely describes a preferred embodiment of the present invention which is given by way of illustration or example.

Figure 1:
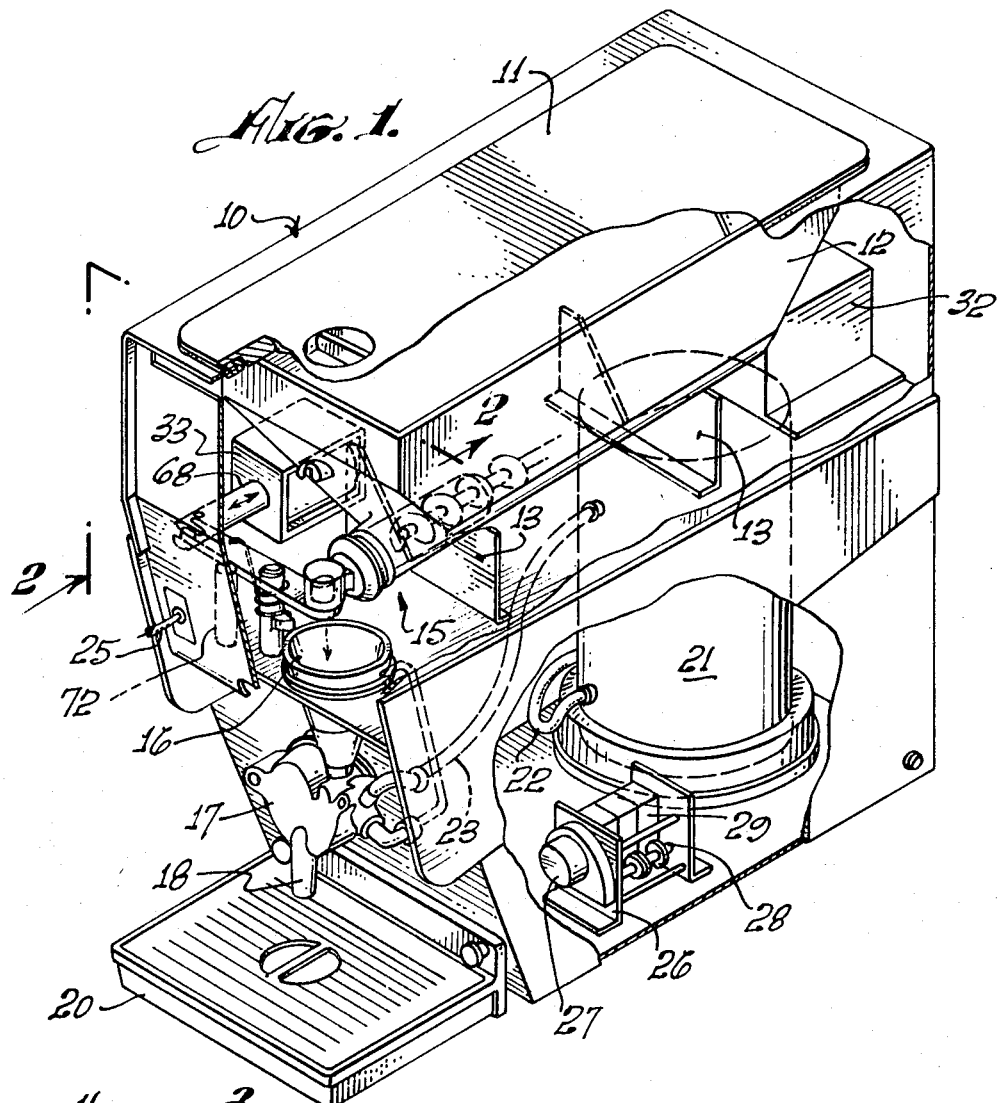
FIG. 1 is a perspective view of a hot chocolate machine incorporating a preferred embodiment of the dispenser, with portions of the housing broken away to show the arrangement of the interior elements.
Figure 2:
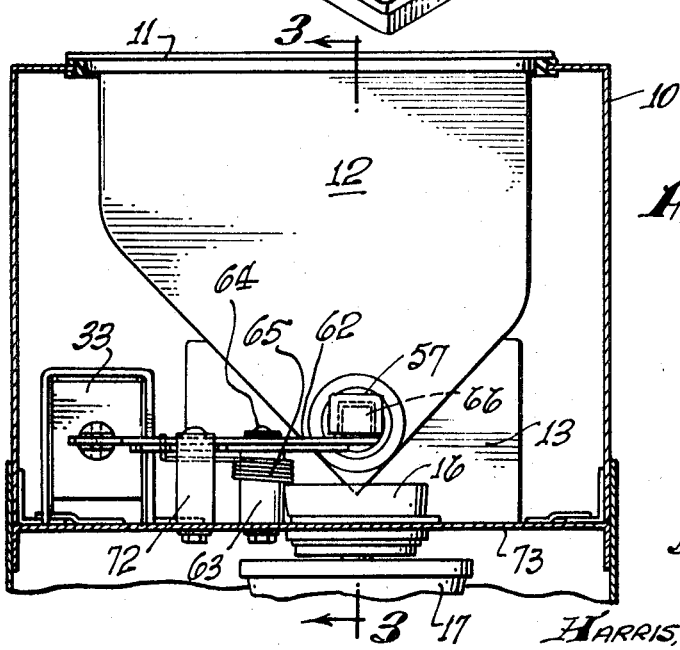
FIG. 2 is a partial sectional view taken along the line 2—2 of FIG. 1.

The hot chocolate machine illustrated in the drawings includes a housing 10 with a removable top cover 11 providing access to a liquid chocolate container or hopper 12 which rests on a pair of V notched support brackets 13.

A liquid chocolate dispenser indicated generally at 15 provides for liquid flow through a ring 16 positioned above the conical mouth of a mixer 17 having an outlet spout 18. The mixer 17 provides for mixing the liquid chocolate with hot water and aerating the mixture and a preferred construction for the mixer is illustrated in U.S. Pat. No. 3,212,757.

A tray-like shelf 20 is fixed on the front of the housing and provides for supporting a cup under the outlet spout 18. A source of hot water 21 is mounted within the housing and is connected to a water supply via line 22. The source 21 may be conventional in design and provides for heating the water and incorporates a constant flow valve operated by an electric solenoid for directing hot water to the mixer 17 via another line 23.

The machine is operated by a manually actuated electric switch 25 and an electric control unit 26. The control unit 26 includes a motor and gear reduction unit 27 driving a cam shaft 28, with the cams on the shaft operating electric switches 29. The switch 25 is actuated manually to start the motor 27. One of the cams on the shaft 28 operates one of the switches 29 to cause the motor 27 to run one complete cycle when the switch 25 is actuated. Another cam operates another switch to open the solenoid valve of the water source 21 to deliver water at a constant rate of flow for a predetermined period of time to the mixer 17. Another cam operates another switch to energize an electric motor 32 and an electric solenoid 33 for a predetermined period of time. The motor 32 and solenoid 33 operate the liquid dispenser.

Figure 3:
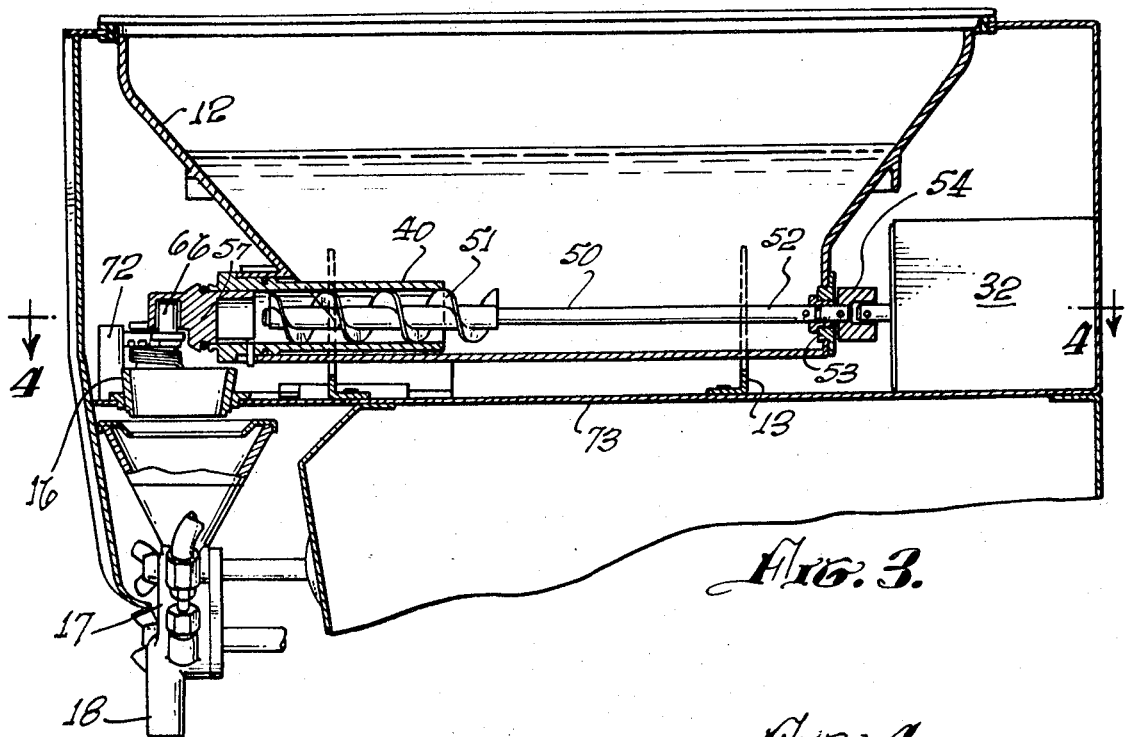
FIG. 3 is a partial sectional view taken along the line 3—3 of FIG. 2.
Figure 4:
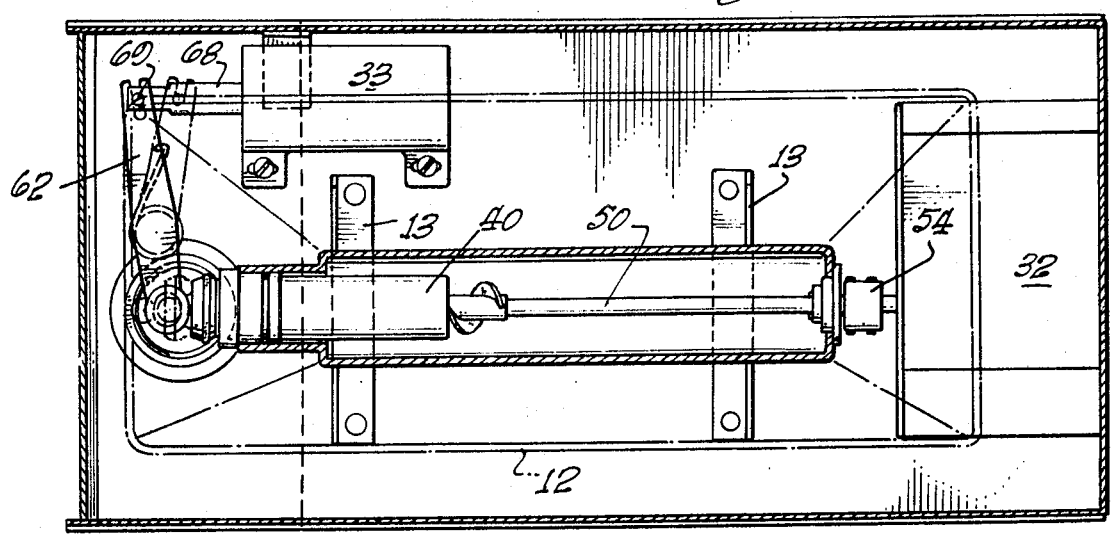
FIG. 4 is a sectional view taken along the line 4—4 of FIG. 3.

In the preferred form of the dispenser illustrated in the drawings, a sleeve 40 is positioned in an outlet passage 41 formed in the lower portion of the container 12. The sleeve 40 is preferably inserted from the exterior of the container and projects into the container for some distance, as best seen in FIG. 3. An O-ring 42 may be positioned in an annular groove in the sleeve 40 to provide a fluid tight seal with the passage 41. A shoulder 43 on the sleeve 40 serves as a stop for positioning the sleeve in the container, and a pin 44 may be carried on the sleeve for engaging a J-shaped slot 45 locking the sleeve in position.

An auger 50 is positioned in the bottom portion of the container 12, with a multiturn screw 51 disposed within the sleeve 40 and with a shaft 52 projecting through a seal 53 and connected to the output shaft of the motor 32 by a coupling 54. The outside diameter of the auger screw corresponds to the inside diameter of the sleeve 40 to provide a substantially fluid tight seal.

A closure is provided for the outer end of the sleeve 40 and includes a piston type valve 57 having a sleeve 58 sliding within the sleeve 40. An O-ring 59 is positioned in an annular groove backed up by an annular shoulder 60 on the valve 57 for sealing engagement with the end of the sleeve 40. The valve 57 is reciprocated between the closed position of FIG. 3 and the open position of FIG. 5 by a lever 62 and the solenoid 33. When in the open position, liquid may flow from the sleeve 40 to the ring 16 and mixer 17 through a slot 61 in the valve sleeve 58.

The lever 62 is mounted on a post 63 by a screw 64 and is urged toward the valve closed position by a spring 65. A boss 66 on one end of the lever 62 is positioned in an opening in the valve 57. The other end of the lever 62 is coupled to a plunger 68 of the solenoid 33 by a pin 69 carried by the plunger and riding in a slot in the end of the lever 62. A stop post 72 may be mounted on a plate 73 of the housing to limit movement of the lever in the valve closed direction.

Figure 5:
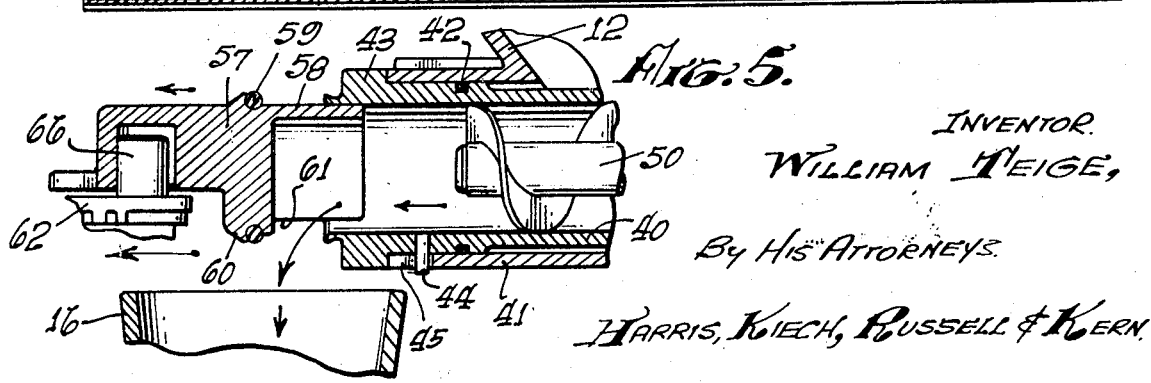
FIG. 5 is an enlarged sectional view of a portion of the apparatus of FIG. 3 illustrating the operation of the dispenser.

Rotation of the auger 50 within the sleeve 40 provides a positive displacement mechanism with the output of liquid being directly proportional to the time the auger is turning and being independent of the quantity of liquid in the container 12. The dispenser does not rely upon gravity for metering the liquid and is not sensitive to the pressure head, which varies with the amount of liquid in the container. When the motor 32 is energized to rotate the auger and the solenoid 33 is energized to pull in the plunger 68, rotate the lever 62 and move the valve 57 to the left as seen in FIG. 5, liquid chocolate will be delivered to the mixer 17 at a constant rate. When the motor and solenoid are de-energized, the spring 65 will move the lever and valve to close the liquid outlet to provide a sharp cut-off and improve the precision of the control of quantity of liquid dispensed.

In the embodiment illustrated, the timer control unit 26 automatically controls the duration of operation of the device. In an alternative arrangement, the manually operated switch 25 could be used to energize the water and chocolate dispensers, with the person operating the switch controlling the time the dispensers operate. With this mode of operation, the rates of flow of liquid chocolate and hot water are constant so that the resulting mixture will have a uniform composition. While a solenoid operated valve has been illustrated, it will be readily understood that other valve operating mechanisms can be utilized and that the valve may be operated manually if desired.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim:

1. In apparatus for dispensing controlled quantities of liquid, the combination of:
    a container for the liquid;
    an outlet sleeve in said container with an inner end within said container and an outer end outside said container;
    an auger positioned in said sleeve;
    means for rotating said auger to advance a quantity of liquid through said sleeve;
    a closure for said outer end of said sleeve and including a second sleeve slidable in said outlet sleeve and carrying sealing means for engaging said outer end, with said second sleeve having an outlet opening in the side wall thereof; and
    means for moving said closure into and out of sealing engagement with said sleeve with said means for moving being capable of moving said closure out of sealing engagement to dispense liquid without removing said second sleeve from said outlet sleeve, and including
    an electrical solenoid and plunger,
    a lever with one end coupled to said plunger and with the other end coupled to said closure,
    mounting means for pivotally supporting said lever, and
    a spring engaging said mounting means and said lever for urging said lever and closure toward said sleeve, with said solenoid when energized acting on said plunger to move said lever and closure against the action of said spring.

2. Apparatus as defined in claim 1 including:
    an electrical control for energizing said solenoid and said auger rotating means; and
    a manually actuated switch for starting said electrical control;
    with said electrical control including means for de-energizing said solenoid and auger rotating means a predetermined time after energization.

3. In a machine for mixing and dispensing a hot chocolate drink and having a source of hot water, a container for the chocolate, a mixer for mixing water and chocolate, and an electric timer control, a liquid chocolate dispenser comprising in combination:
    an outlet sleeve in the container for fluid flow from the container;
    an auger positioned in said sleeve;
    means for rotating said auger to advance a quantity of liquid chocolate through said sleeve;
    a valve for closing the outer end of said sleeve; and
    means for moving said valve into and out of sealing engagement with said sleeve, with said electric timer control operating said means for rotating said auger and said means for moving said valve and said source of hot water for predetermined periods of time delivering predetermined amounts of chocolate and water to said mixer.

* * * * *